J. L. McPherson,

Balance Scale.

No. 12,246.  Patented Jan. 16, 1855.

UNITED STATES PATENT OFFICE.

JOHN L. McPHERSON, OF NEW VIENNA, OHIO.

SCALE.

Specification of Letters Patent No. 12,246, dated January 16, 1855.

*To all whom it may concern:*

Be it known that I, JOHN L. MCPHERSON, of New Vienna, in the county of Clinton and State of Ohio, have invented a new and useful Improvement in Scales for Weighing; and I do hereby declare that the following is a full, clear, and exact description of the construction and operation of the same, reference being had to the annexed drawing, forming part of this specification, in which—

Figure 1:
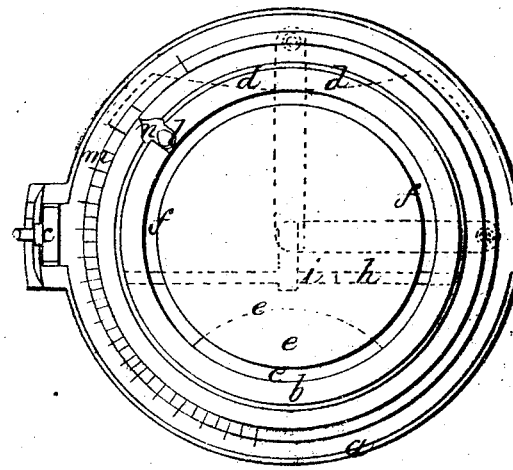
Figure 2:
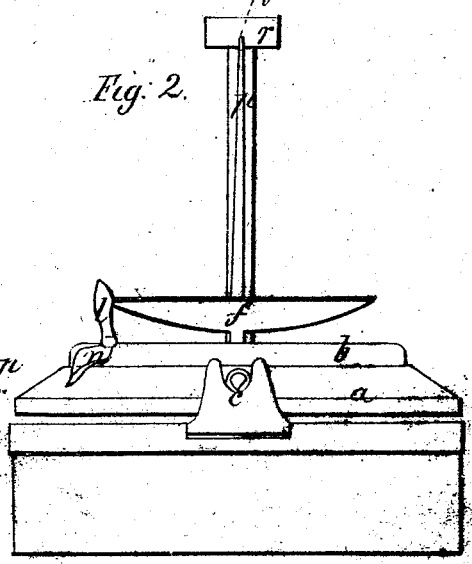
Figure 3:
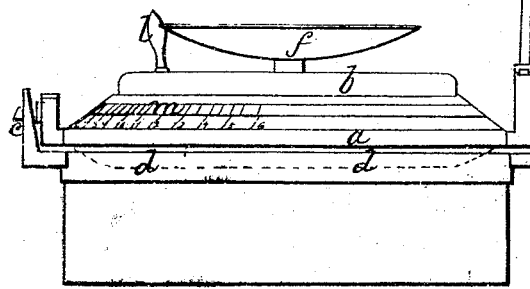
Figure 4:
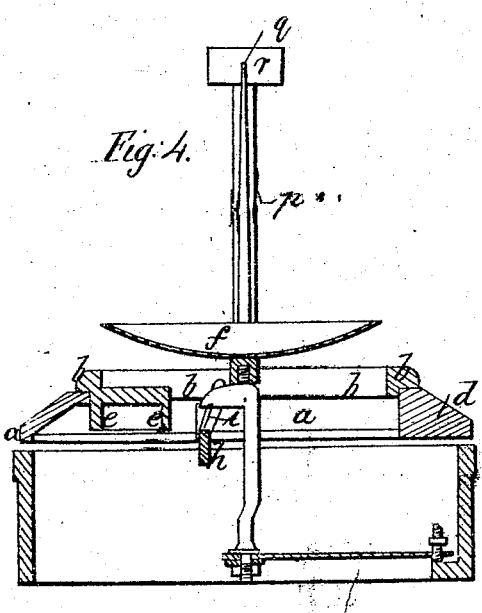

Figure 1 is a top view of the weighing apparatus. Fig. 2 is an elevation of same, in line with axis of suspension. Fig. 3 is an elevation perpendicular to axis of suspension. Fig. 4 is a central vertical section perpendicular to axis of suspension.

Similar letters of reference in the several figures denote the same part.

My invention consists in constructing the scale of two concentric circular rims, the exterior supported by knife edges, and the inner rim movable; the dish resting on a bar running across the outer rim, on one side of its axis of suspension; the balance being produced when weighing, by so moving the inner rim that a weight attached to it shall approach a weight fastened to the outer rim on the opposite side of the axis of suspension; a pointer attached to the movable rim indicating on a graduated arc of the outer rim, the weight upon the disk.

In the drawing $a$ and $b$ are the rims supported on the knife edges $c$, and so loaded by weights $d$ and $e$ as to be accurately balanced when the weights are on opposite sides of the axis of suspension. The dish $f$ is supported on a knife edge $i$ of a bar $h$, running across the outer rim $a$ on the side of the axis of suspension nearest the weight $e$. Any substance placed upon the dish, will, it is evident, add to the weight on that side of the axis of suspension; and for the restoration of the equilibrium, render it necessary to move the weight $e$ toward the weight $d$. To do this, the rim $b$ is moved within the rim $a$, by means of the knob $l$, until the pointer $p$ rests on the mark $q$ of the indicator $r$; the scale will then be again balanced on the knife edges $c$, and the weight of the article in the dish indicated by the division of the graduated arc $m$, upon which the pointer $n$ rests. Should the scale rest on a surface having a slight inclination, the indicator $r$ can be so adjusted that the pointer $p$ will rest on the mark $q$ when the empty scale is balanced, by loosening the screw $t$ and moving the indicator laterally.

What I claim as new and desire to secure by Letters Patent, is—

The concentric loaded rims $a$ and $b$, in combination with the attachment of the dish; constructed, arranged and operating substantially as, and for the purposes specified.

In testimony whereof, I have hereunto signed my name before two subscribing witnesses.

JOHN L. McPHERSON.

Witnesses:
WM. P. ELLIOT,
SAML. GRUBB.